United States Patent
Uchibori

(10) Patent No.: US 9,090,227 B2
(45) Date of Patent: Jul. 28, 2015

(54) SEAT BELT RETRACTOR AND SEAT BELT SYSTEM INCLUDING SEAT BELT RETRACTOR

(71) Applicant: TAKATA CORPORATION, Tokyo (JP)

(72) Inventor: Hayato Uchibori, Tokyo (JP)

(73) Assignee: Takata Corporation, Tokyo (JP)

( * ) Notice: Subject to any disclaimer, the term of this patent is extended or adjusted under 35 U.S.C. 154(b) by 173 days.

(21) Appl. No.: 13/766,675

(22) Filed: Feb. 13, 2013

(65) Prior Publication Data

US 2013/0214081 A1 Aug. 22, 2013

(30) Foreign Application Priority Data

Feb. 17, 2012 (JP) .................................. 2012-032409

(51) Int. Cl.
*B60R 22/36* (2006.01)
*B60R 22/34* (2006.01)

(52) U.S. Cl.
CPC ............. *B60R 22/36* (2013.01); *B60R 22/3413* (2013.01)

(58) Field of Classification Search
CPC ..................... B60R 22/3413; B60R 2022/286; B60R 2022/287
USPC ..................................................... 242/379.1
See application file for complete search history.

(56) References Cited

U.S. PATENT DOCUMENTS

| | | | | |
|---|---|---|---|---|
| 5,967,441 A | * | 10/1999 | Kohlndorfer et al. | 242/379.1 |
| 5,984,223 A | * | 11/1999 | Hiramatsu | 242/379.1 |
| 6,499,554 B1 | * | 12/2002 | Yano et al. | 180/268 |
| 6,568,621 B2 | * | 5/2003 | Hiramatsu et al. | 242/379.1 |
| 6,592,064 B2 | * | 7/2003 | Clute et al. | 242/379.1 |
| 7,152,824 B2 | * | 12/2006 | Shiotani et al. | 242/379.1 |
| 7,669,794 B2 | * | 3/2010 | Boelstler et al. | 242/379.1 |
| 8,083,262 B2 | * | 12/2011 | Hiramatsu et al. | 280/807 |
| 8,286,903 B2 | * | 10/2012 | Ogawa et al. | 242/379.1 |
| 2010/0123348 A1 | * | 5/2010 | Hiramatsu et al. | 297/476 |

FOREIGN PATENT DOCUMENTS

JP    2010-137837    6/2010

* cited by examiner

*Primary Examiner* — Emmanuel M Marcelo
*Assistant Examiner* — Justin Stefanon
(74) *Attorney, Agent, or Firm* — Foley & Lardner LLP

(57) ABSTRACT

To prevent the tilt of a locking member with respect to a spool even when the spool is tensioned by a seat belt in case of emergency.
A second EA plate support member 16 that is integrated with a locking base 19 has a supported portion 21 having a cylindrical shape. The supported portion 21 is fitted into a locking base tilt prevention support portion 20 of a spool 9 and is supported so as to be rotatable relative to the locking base tilt prevention support portion 20 while the tilt of the supported portion 21 with respect to the spool 9 is being prevented. In this manner, even when the spool 9 is tensioned upward by a large tensional force of the seat belt 4 in case of emergency, the tilt of the center axis of the locking base 19 with respect to the center axis of the spool 9 is prevented. Thus, the EA operation of a seat belt retractor 3 is reliably and effectively performed.

10 Claims, 6 Drawing Sheets

SEAT BELT RETRACTOR AND SEAT BELT SYSTEM INCLUDING SEAT BELT RETRACTOR

CROSS-REFERENCE TO RELATED PATENT APPLICATIONS

This application claims priority of Japan Priority Application 2012/032409, filed Feb. 17, 2012 including the specification, drawings, claims and abstract, is incorporated herein by reference in its entirety.

BACKGROUND OF THE INVENTION

1. Technical Field

The present invention relates to a technology regarding a seat belt retractor that withdrawably retracts a seat belt, and more specifically, it relates to a technology regarding a seat belt retractor including an energy absorbing member (EA member), such as a torsion bar, for limiting the load imposed on the seat belt by absorbing inertial energy (kinetic energy) of an occupant in case of emergency (i.e., when the seat belt is worn and sudden deceleration of the vehicle, such as caused by a collision, occurs) and a seat belt system including the seat belt retractor.

2. Background Art

Hitherto, a seat belt system provided in a vehicle, such as a motor vehicle, restrains the occupant by a seat belt in case of emergency as described above. In general, such a seat belt system includes a seat belt retractor that retracts the seat belt. In the seat belt retractor, the seat belt is retracted around a spool if the seat belt is not worn. When the seat belt is worn, the seat belt is withdrawn and is placed about an occupant. In case of emergency as described above, a lock mechanism of the seat belt retractor is activated so as to prevent the rotation of the spool in a direction in which the belt is withdrawn. Thus, withdrawal of the seat belt is prevented. In this manner, in case of emergency, the occupant is restrained by the seat belt.

In general, a seat belt retractor of an existing seat belt system limits the load imposed on the seat belt by absorbing the inertial energy of the occupant using an EA member. Some existing seat belt retractors limit the load imposed on the seat belt by effectively absorbing the inertial energy of the occupant through an energy absorbing operation (EA operation) caused by torsional deformation of a torsion bar serving as a first EA member and the energy absorbing operation (EA operation) caused by deformation of an EA plate serving as a second EA member (refer to, for example, PTL 1).

As illustrated in FIG. 6, in the seat belt retractor described in PTL 1, a shaft portion c of a locking base b of a lock mechanism a is inserted into and is disposed in a hole f extending in an axis direction of a spool e that retracts a seat belt d. In such a case, the shaft portion c of the locking base b is supported by the spool e via a ring member g.

In addition, a torsion bar h and an EA plate (not illustrated in FIG. 6) are disposed between the locking base b and the spool e. At a normal time, the locking base b and the spool e rotate in unison. In case of emergency, a lock portion $b_1$ of the locking base b is locked by a pawl (not illustrated), and the rotation of the locking base b is stopped. Thus, the spool e rotates relative to the locking base b in a direction in which the seat belt is withdrawn. The relative rotation between the spool e and the locking base b causes torsional deformation of the torsion bar h. In this manner, a first EA operation that absorbs the inertial energy of the occupant is performed. Furthermore, the EA plate deforms and, therefore, a second EA operation that absorbs the inertial energy of the occupant is performed. As a result, the load imposed on the seat belt d that restrains the occupant in case of emergency can be limited.

CITATION LIST

Patent Literature

[PTL 1] Japanese Unexamined Patent Application Publication No. 2010-137837

SUMMARY OF THE INVENTION

Technical Problem

Note that as described above, in the seat belt retractor described in PTL 1, the shaft portion c of the locking base b is inserted into the hole f in the axis direction of the spool e and is supported by the spool e via the ring member g. At that time, a slight gap is formed between the outer peripheral surface of the shaft portion c of the locking base b and the outer peripheral surface of the spool e. If, in case of emergency, the spool e is tensioned by a large tensional force F of the seat belt d due to the inertial energy of the occupant and rotates in the direction in which the seat belt is withdrawn, the center axis of the locking base b slightly tilts with respect to the center axis of the spool e due to the gap. The slight tilt of the locking base b with respect to the spool e does not interfere with the EA operations performed by the seat belt retractor. However, in order for the seat belt retractor to perform the EA operations more reliably and effectively, it is desirable that the tilt of the locking base b with respect to the spool e be minimized.

Accordingly, the object of the present invention is to provide a seat belt retractor capable of preventing the tilt of the locking member with respect to the spool even when the spool is tensioned by the seat belt in case of emergency and a seat belt system including the seat belt retractor.

Solution to Problem

To solve the above-described problem, according to the present invention, a seat belt retractor includes a spool that is rotatably disposed and that retracts a seat belt, a lock mechanism having a locking member, where the locking member rotates together with the spool at normal times and rotation of the locking member in a direction in which the seat belt is withdrawn is prevented in case of emergency, a first energy absorbing member configured to absorb inertial energy of an occupant and limit the load imposed on the seat belt when the spool rotates relative to the locking member in case of emergency, a spool relative-rotation lock member activated by the spool, where the spool relative-rotation lock member locks rotation of the spool relative to the locking member if the spool rotates relative to the locking member by a predetermined amount, a locking member tilt preventing portion provided in the spool, and a supported portion provided in the locking member, where the supported portion is fitted into the locking member tilt preventing portion so as to be rotatable relative to the locking member tilt preventing portion and supported by the locking member tilt preventing portion. The supported portion of the locking member is fitted into the locking member tilt preventing portion of the spool so that the tilt of the supported portion with respect to the spool is prevented.

In addition, in the seat belt retractor according to the present invention, the locking member tilt preventing portion is formed as a ring-shaped protruding portion.

Furthermore, in the seat belt retractor according to the present invention, the first energy absorbing member is disposed so as to be concentric with the spool. The first energy absorbing member is formed to act as a torsion bar having one end connected to the spool for rotation in unison with the spool and the other end connected to the locking member for rotation in unison with the locking member. When the spool rotates relative to the locking member, the torsion bar is torsionally deformed to limit the load imposed on the seat belt.

Still furthermore, the seat belt retractor according to the present invention includes a second energy absorbing member disposed between the spool and the locking member. The second energy absorbing member absorbs inertial energy of an occupant and limits the load imposed on the seat belt when the spool rotates relative to the locking member.

Yet still furthermore, in the seat belt retractor according to the present invention, the second energy absorbing member is formed to act as an energy absorbing plate having one end supported by the spool and the other end fixed to the locking member. When the spool rotates relative to the locking member, the energy absorbing plate deforms and limits the load imposed on the seat belt.

Yet still furthermore, in the seat belt retractor according to the present invention, when the energy absorbing plate is inactive, the energy absorbing plate extends from the other end fixed to the locking member in a direction in which the seat belt is withdrawn, is bent into a U shape to form a bent portion, and extends from the bent portion in a direction in which the seat belt is retracted.

Yet still furthermore, in the seat belt retractor according to the present invention, the spool relative-rotation lock member is formed as a nut-shaped stopper, and the stopper is threadably mounted on a male screw formed on the locking member. When the spool rotates relative to the locking member, the stopper is rotated by the spool, moves along the male screw by a predetermined distance, and locks the rotation of the spool relative to the locking member.

In contrast, according to the present invention, a seat belt system for restraining an occupant by a seat belt in case of emergency is provided. The seat belt system includes a seat belt retractor that retracts the seat belt, where the seat belt retractor stops withdrawal of the seat belt in case of emergency, a tongue slidably supported by the seat belt withdrawn from the seat belt retractor, and a buckle that allows the tongue to be releasably engaged therewith. The seat belt retractor is any one of the above-described seat belt retractors according to the present invention.

Advantageous Effects of Invention

According to the seat belt retractor having such a structure of the present invention and the seat belt system including the seat belt retractor, the locking member tilt preventing portion that is disposed in the spool and that is capable of preventing the tilt of the supported portion of the locking member with respect to the spool is provided. Accordingly, even when the seat belt is tensioned by a large tensional force of the seat belt, the tilt of the center axis of the locking member with respect to the center axis of the spool can be prevented by the locking member tilt preventing portion. Thus, even when the spool is tensioned by the seat belt in case of emergency, the center axis of the locking member can be accurately kept coaxial with the center axis of the spool. As a result, the first EA member can be reliably torsionally deformed in case of emergency, and the EA operation of the first EA member can be more reliably and effectively performed. That is, in case of emergency, the occupant can be properly and effectively restrained by the seat belt. In particular, since the locking member tilt preventing portion is formed as a ring-shaped protruding portion, the locking member can be reliably supported using a simplified structure.

In addition, even when the second EA member is disposed between the spool and the locking member, the tilt of the locking member with respect to the spool is prevented, as described above. Accordingly, the second EA member can be also reliably deformed in case of emergency. In this manner, the EA operation of the second EA member can be more reliably and effectively performed. Thus, the occupant can be more properly and effectively restrained by the seat belt in case of emergency.

Furthermore, since, as described above, the tilt of the locking member with respect to the spool is prevented although the tilt of the locking member with respect to the spool varies in accordance with the lock position of the locking member determined by a pawl, the limit load of the seat belt can be more reliably maintained. Still furthermore, since the tilt of the locking member with respect to the spool is prevented, a variation in the radius of the bent portion of an EA plate serving as the second EA member can be restricted. Thus, the limit load of the seat belt can be more reliably maintained.

DETAILED DESCRIPTION OF THE PREFERRED EMBODIMENTS

Embodiments of the present invention are described below with reference to the accompanying drawings.

Figure 1:
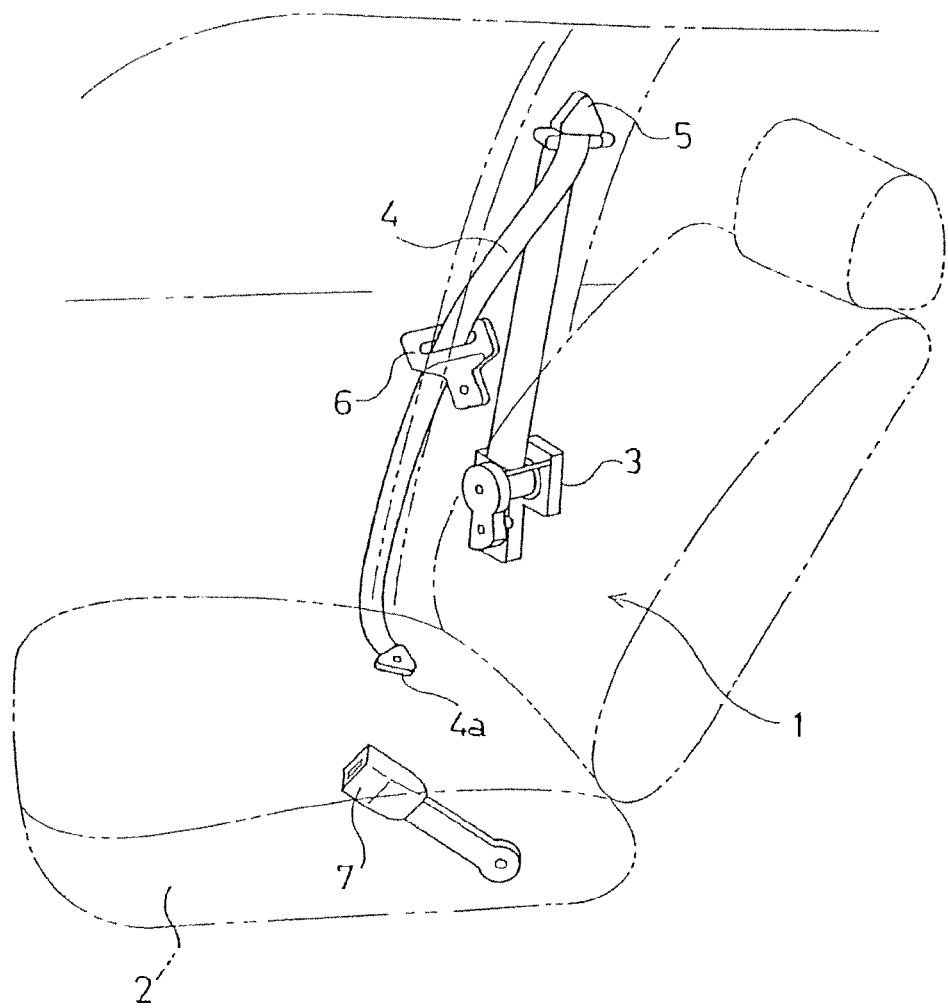
FIG. 1 is a schematic illustration of a seat belt system including a seat belt retractor according to an embodiment of the present invention.

FIG. 1 is a schematic illustration of a seat belt system including a seat belt retractor according to an embodiment of the present invention.

As illustrated in FIG. 1, like an existing three-point seat belt system using a seat belt retractor, a seat belt system 1 according to the present embodiment includes a seat belt retractor 3 fixed to a vehicle body at a point near a vehicle seat 2, a seat belt 4 withdrawn from the seat belt retractor 3 and having a belt anchor 4a at the top end, where the belt anchor 4a is fixed to the floor of the vehicle body or the vehicle seat 2, a guide anchor 5 that leads the seat belt 4 withdrawn from the seat belt retractor 3 toward the shoulder of the occupant, a tongue 6 slidably supported by the seat belt 4 led by the belt anchor 5, and a buckle 7 that is fixed to the floor of the vehicle body or the vehicle seat 2 and that allows the tongue 6 to be releasably inserted thereinto and engaged therewith.

Figure 2:
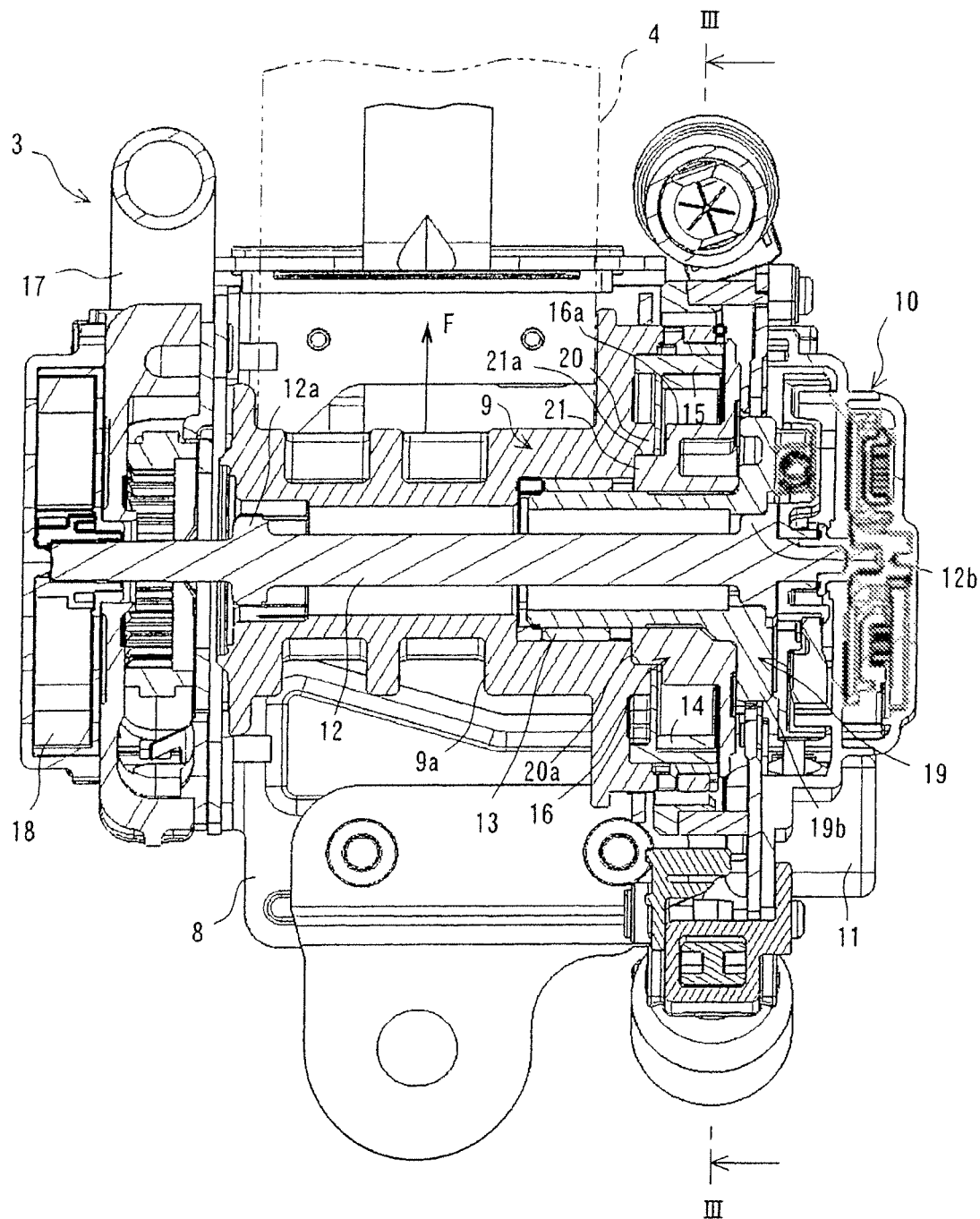
FIG. 2 is a longitudinal cross-sectional view of the seat belt retractor illustrated in FIG. 1 according to the embodiment.
Figure 3:
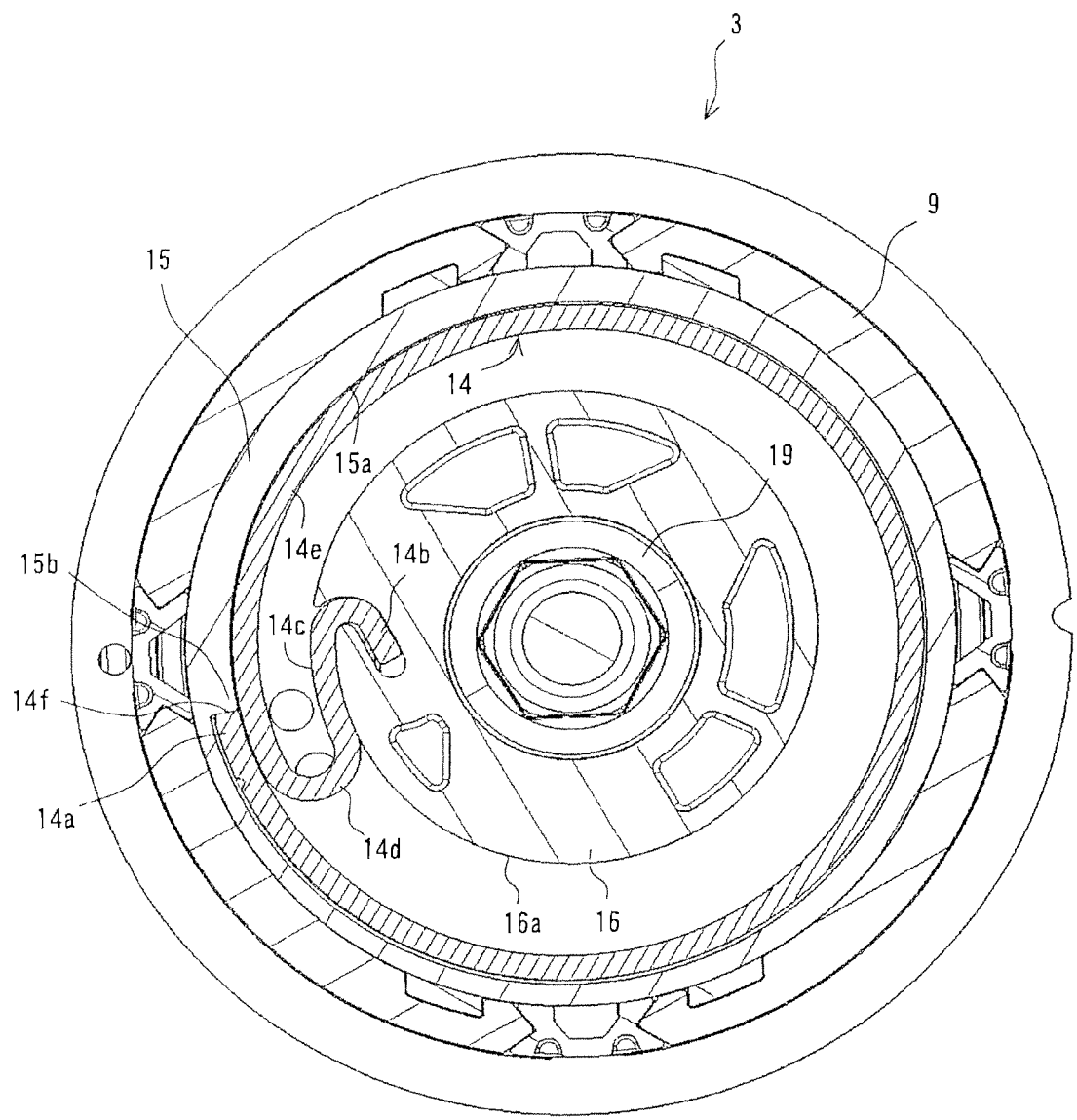
FIG. 3 is a partial cross-sectional view taken along a line III-III of FIG. 2.

FIG. 2 is a longitudinal cross-sectional view of the seat belt retractor according to the present embodiment. FIG. 3 is a partial cross-sectional view taken along a line III-III of FIG. 2.

According to the present embodiment, the seat belt retractor 3 has a structure that is substantially the same as that of the emergency lock seat belt retractor (ELR) described in PTL 1. Only part of the seat belt retractor 3 differs from the seat belt retractor described in PTL 1. Accordingly, among the sub-structures of the structure of the seat belt retractor 3, the sub-structures and their operations of the seat belt retractor 3 that are the same as those of the seat belt retractor described in PTL 1 are briefly described first.

As illustrated in FIGS. 2 and 3, like the seat belt retractor described in PTL 1, the seat belt retractor 3 according to the present embodiment includes a U-shaped frame 8, a spool 9 that retracts the seat belt 4, a lock mechanism 10, a deceleration detecting mechanism 11, a torsion bar 12 (corresponding to a first EA member according to the present invention), a nut-shaped stopper 13 (corresponding to a spool relative-rotation lock member according to the present invention), an energy absorbing (EA) plate 14 (corresponding to a second EA member according to the present invention), a cylindrical first EA plate support member 15, a cylindrical second EA plate support member 16, a pretensioner 17, and a spring mechanism 18.

The lock mechanism 10 locks the rotation of the spool 9 in a direction in which the seat belt is withdrawn. The lock mechanism 10 includes at least a locking base 19 (corresponding to a locking member according to the present invention). The rotation of the locking base 19 in the direction in which the seat belt is withdrawn is locked in case of emergency. Upon detecting a sudden deceleration of the vehicle in case of emergency, the deceleration detecting mechanism 11 activates the lock mechanism 10. When the lock mechanism 10 is activated, the rotation of the locking base 19 in a direction in which the seat belt is withdrawn is locked.

The torsion bar 12 is disposed so as to be concentric with a seat belt retracting unit 9a of the spool 9. One end 12a of the torsion bar 12 is connected to the spool 9 so that the torsion bar 12 is rotatable in unison with the spool 9. The other end 12b is connected to the locking base 19 so that the torsion bar 12 is rotatable in unison with the locking base 19. The torsion bar 12 is tortionally deformed when the spool 9 rotates relative to the locking base 19 in the direction in which the seat belt is withdrawn. Thus, the torsion bar 12 absorbs the inertial energy of the occupant and, therefore, the load imposed on the seat belt 4 is limited. The stopper 13 is threadably mounted on a male screw portion 19a (illustrated in FIG. 5 described below) of the locking base 19. The stopper 13 is rotated in unison with the spool 9 when the spool 9 rotates relative to the locking base 19 in a direction in which the seat belt is withdrawn in case of emergency. Thus, the stopper 13 moves towards the locking base 19 relative to the spool 9 and the locking base 19 along the male screw portion 19a in the axis direction. After the stopper 13 moves by a predetermined distance and is brought into contact with the locking base 19, the movement of the stopper 13 in the axis direction stops. At that time, the rotation of the spool 9 in a direction in which the seat belt is withdrawn is locked, via the stopper 13 that is stopped, by the locking base 19 whose rotation in a direction in which the seat belt is withdrawn is locked. At that time, since the rotation of the spool 9 is locked, the torsional deformation of the torsion bar 12 is stopped. In this manner, the amount of the torsional deformation is limited to a predetermined amount.

The EA plate 14 is disposed between the first EA plate support member 15 that is provided on the spool 9 and that is rotatable in unison with the spool 9 and the second EA plate support member 16 that is provided on the locking base 19 and that is rotatable in unison with the locking base 19. More specifically, one end portion 14a of the EA plate 14 is displaceably supported by the first EA plate support member 15, and the other end portion 14b of the EA plate 14 is fixed to the second EA plate support member 16. In such a case, as illustrated in FIG. 3, according to the present embodiment, a portion 14c of the EA plate 14 that extends from the other end portion 14b fixed to the second EA plate support member 16 is wound around the outer peripheral surface 16a of the second EA plate support member 16 in a direction in which the seat belt is withdrawn (the counterclockwise direction in FIG. 3). A U-shaped bent portion 14d of the EA plate 14 extending from the portion 14c changes the direction in which the EA plate 14 extends into a direction in which the seat belt is retracted (the clockwise direction in FIG. 3) while being rewound. At that time, a portion 14e that is wound in the direction in which the seat belt is retracted is wound around the inner peripheral surface 15a of the first EA plate support member 15. An end 14f of the EA plate 14 is in contact with a pressing portion 15b which is a stepped portion formed on the inner peripheral surface 15a of the first EA plate support member 15 in the direction in which the seat belt is retracted.

When the spool 9 rotates relative to the locking base 19 in the direction in which the seat belt is withdrawn, the pressing portion 15b of the first EA plate support member 15 urges the end 14f of the EA plate 14 in the direction in which the seat belt is withdrawn. Accordingly, the bent portion 14d moves so that the EA plate 14 is deformed. The deformation of the EA plate 14 absorbs the inertial energy of the occupant, and the load imposed on the seat belt 4 is limited.

The pretensioner 17 rotates the spool 9 by a predetermined amount in the direction in which the seat belt is retracted in the initial stage of an emergency. Thus, the seat belt 4 is retracted by the spool 9 by the predetermined length. The spring mechanism 18 always urges the spool 9 in the direction in which the seat belt is retracted. Thus, when the seat belt 4 is not worn, the seat belt 4 is retracted by the spool 9 by the fully retracted length (in a normal case, the length of the seat belt 4 withdrawn from the seat belt retractor 3 when the seat belt 4 is worn).

In the seat belt retractor 3 according to the present embodiment, if, as described above, the lock mechanism 10 locks the rotation of the locking base 19 in the direction in which the seat belt is withdrawn in case of emergency, the spool 9 tortionally deforms the torsion bar 12 due to the inertia of the occupant. In addition, the spool 9 rotates in the direction in which the seat belt is withdrawn while deforming the EA plate 14. Thereafter, if the spool 9 rotates relative to the locking base 19 by a predetermined amount in the direction in which the seat belt is withdrawn, the rotation of the spool 9 is stopped and locked. In this manner, in the seat belt retractor 3 according to the present embodiment, the inertial energy of the occupant is effectively absorbed through the EA operation of the torsional deformation of the torsion bar 12 and the EA operation of the deformation of the EA plate 14. In addition, since the rotation of the spool 9 in the direction in which the seat belt is withdrawn is locked by the stopper 13, the occupant is restrained by the seat belt 4.

As illustrated in FIG. 3, in the seat belt retractor 3 according to the present embodiment, the portion 14e of the EA plate 14 is wound slightly more than one turn around the inner peripheral surface 15a of the first EA plate support member 15 in the direction in which the seat belt is retracted.

In the seat belt retractor 3 according to the present embodiment, when the rotation of the spool 9 in the direction in which the seat belt is withdrawn is locked by the stopper 13, the torsional deformation of the torsion bar 12 and the deformation of the EA plate 14 are completed at the same time or at substantially the same time. That is, in the seat belt retractor 3 according to the present embodiment, the EA operation of the torsion bar 12 and the EA operation of the EA plate 14 are completed at the same time or at substantially the same time. In such a case, the rotational amount of the spool 9 by which the stopper 13 locks the rotation of the spool 9 is set so that almost all of the inertial energy disappear when the two EA operations are completed. In addition, although not illustrated, the design is such that immediately before or after the EA operation of the torsion bar 12 and the EA operation of the EA plate 14 are completed, the occupant is received by an airbag that is inflated.

Figure 4A:
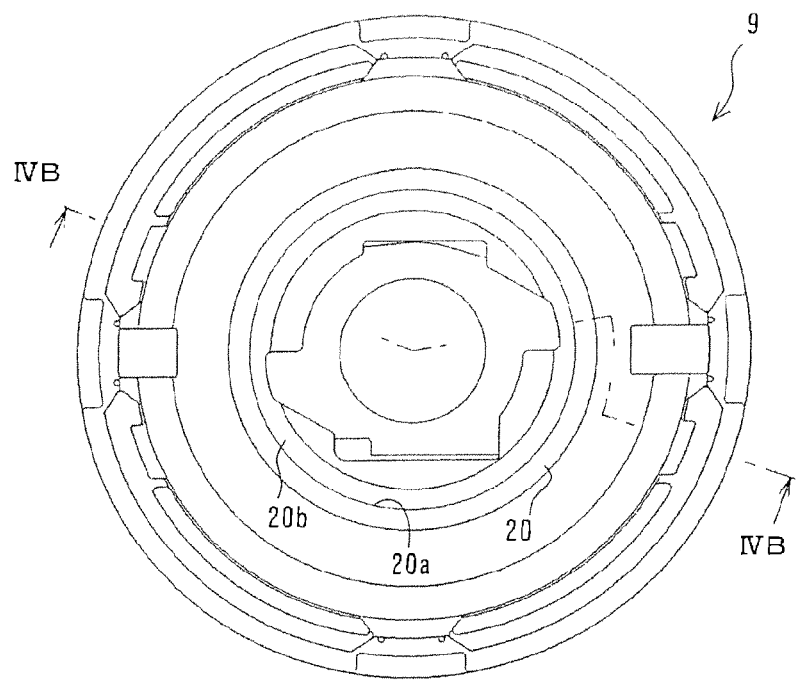
FIG. 4(A) is a right side view of the spool according to the embodiment.
Figure 4B:
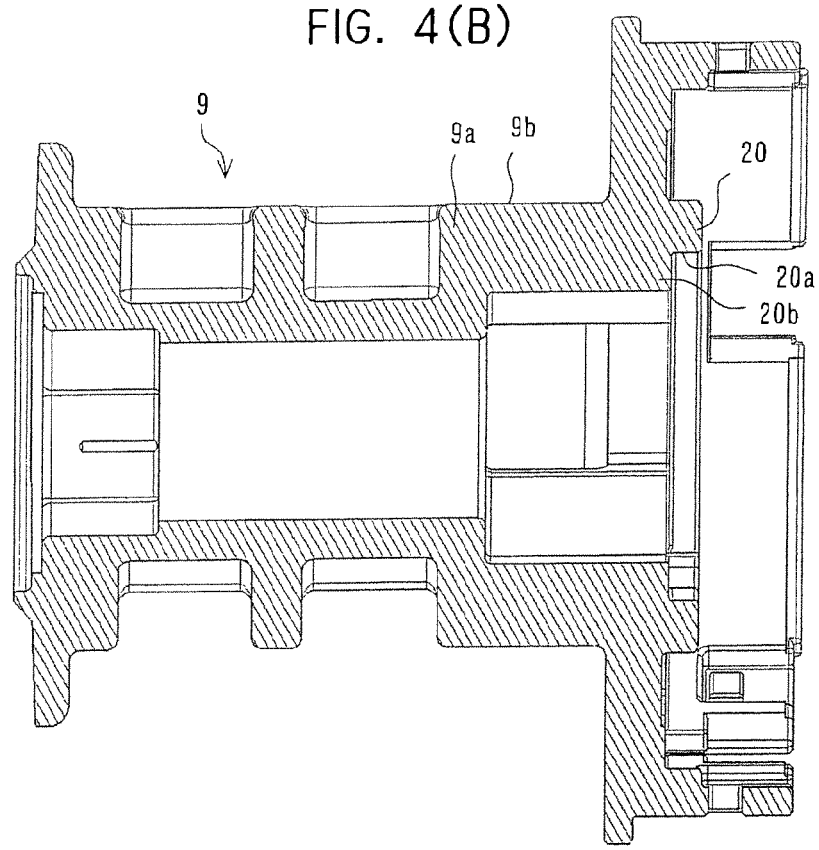
FIG. 4(B) is a cross-sectional view taken along a line IVB-IVB of FIG. 4(A).
Figure 5:
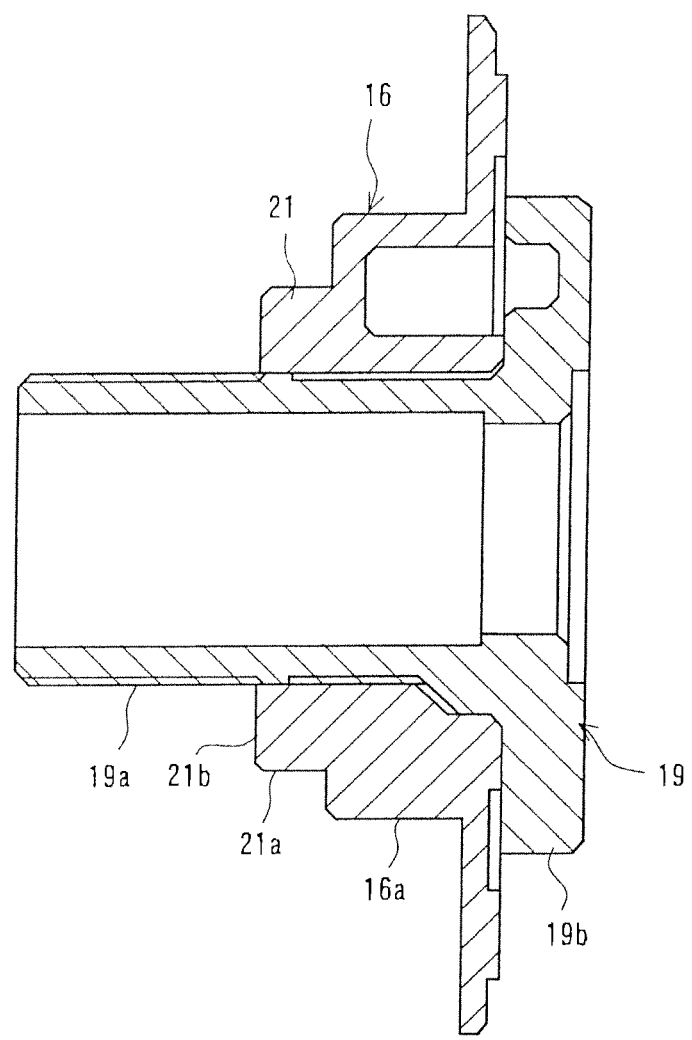
FIG. 5 is a cross-sectional view of the locking base and the second EA plate support member integrated with each other as in FIG. 4(B).
Figure 6:
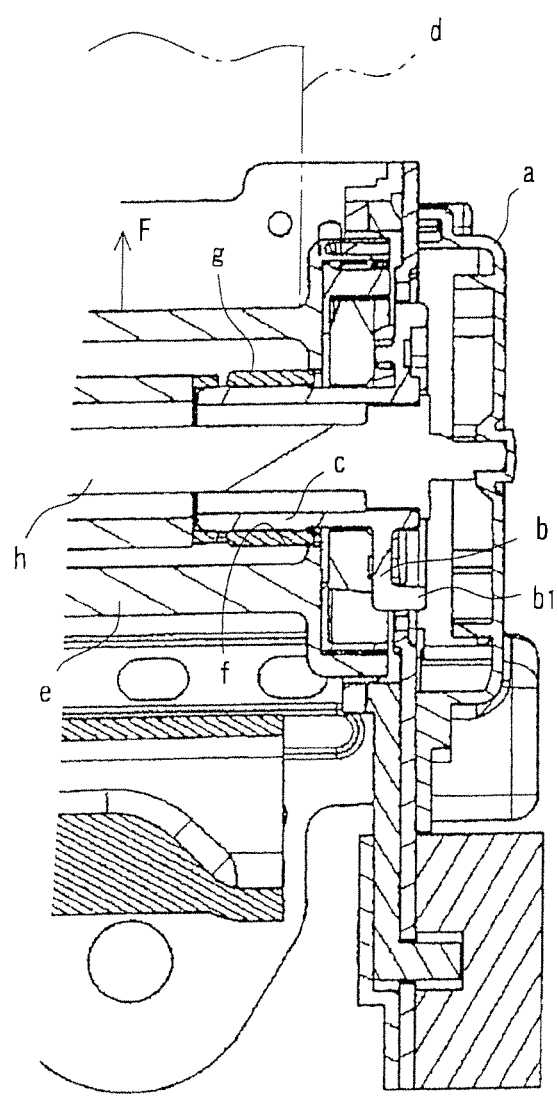
FIG. 6 is a partial cross-sectional view of an existing seat belt retractor described in PTL 1.

FIG. 4(A) is a right side view of the spool according to the present embodiment. FIG. 4(B) is a cross-sectional view taken along a line IVB-IVB of FIG. 4(A). FIG. 5 is a cross-sectional view of the locking base and the second EA plate support member integrated with each other as in FIG. 4(B).

As illustrated in FIGS. 4(A) and 4(B), in the seat belt retractor 3 according to the present embodiment, a locking base tilt prevention support portion 20 (corresponding to a locking member tilt preventing portion according to the present invention) that is formed as a ring-shaped protruding portion is provided on an end face of the spool 9 having the locking base 19 mounted thereon. The inner peripheral surface of the locking base tilt prevention support portion 20 serves as a locking base guide supporting surface 20a that leads and supports the locking base 19. The locking base guide supporting surface 20a forms a circle that is concentric with an outer peripheral surface 9b of the seat belt retracting unit 9a of the spool 9.

As illustrated in FIG. 5, in the seat belt retractor 3 according to the present embodiment, as described above, the locking base 19 and the second EA plate support member 16 are integrated with each other and are fixed. The second EA plate support member 16 has a supported portion 21 having a cylindrical shape. As illustrated in FIG. 2, the supported portion 21 is fitted into and supported by the locking base tilt prevention support portion 20 of the spool 9 so as to be rotatable relative to the locking base tilt prevention support portion 20. In such a case, a gap is negligibly formed between the locking base guide supporting surface 20a of the locking base tilt prevention support portion 20 and an outer peripheral surface 21a of the supported portion 21. The second EA plate support member 16 (i.e., the locking base 19) is fitted into the locking base tilt prevention support portion 20 so that the tilt thereof with respect to the spool 9 is prevented. That is, when the supported portion 21 is fitted into the locking base tilt prevention support portion 20, the second EA plate support member 16 (i.e., the locking base 19) is supported without tilting with respect to the locking base tilt prevention support portion 20 of the spool 9. Thus, even when the spool 9 is tensioned by a large tensional force F of the seat belt 4 in case of emergency, the tilt of the center axis of the locking base 19 with respect to the center axis of the spool 9 can be prevented. Accordingly, the center axis of the spool 9 can be accurately kept coaxial with the center axis of the locking base 19.

Furthermore, when the supported portion 21 is fitted into the locking base tilt prevention support portion 20, an end face 21b of the supported portion 21 is in loose contact with an inner end face 20b of the locking base tilt prevention support portion 20 of the spool 9 so that the supported portion 21 is rotatable relative to the spool 9.

Still furthermore, when the supported portion 21 is fitted into the locking base tilt prevention support portion 20, the locking base guide supporting surface 20a of the locking base tilt prevention support portion 20 is slidable relative to the outer peripheral surface 21a of the supported portion 21. In addition, the end face 20b of the locking base tilt prevention support portion 20 is slidable relative to the end face 21b of the supported portion 21. Accordingly, in the seat belt retractor 3 according to the present embodiment, a lubricant agent, such as wax, is applied to the locking base guide supporting surface 20a of the locking base tilt prevention support portion 20 and the end face 20b. Examples of the wax include widely used vegetable wax, mineral wax, and mixed wax of vegetable-based wax and mineral-based wax. By using such a lubricant agent, friction generated in the above-described sliding portions can be reduced.

According to the seat belt retractor 3 of the present embodiment, the second EA plate support member 16 (i.e., the locking base 19) that is rotatable in unison with the locking base 19 is supported by the locking base tilt prevention support portion 20 so that the tilt of the second EA plate support member 16 is prevented. Accordingly, even when the spool 9 is tensioned by a large tensional force of the seat belt 4 in case of emergency, tilt of the center axis of the locking base 19 with respect to the center axis of the spool 9 can be prevented. Thus, the center axis of the spool 9 can be accurately kept coaxial with the center axis of the locking base 19. In this manner, the torsion bar 12 can be reliably torsionally deformed in case of emergency, and the EA plate 14 can be reliably deformed. As a result, the EA operation of the torsion bar 12 and the EA operation of the EA plate 14 can be further effectively performed. That is, in case of emergency, the occupant can be properly and effectively restrained by the seat belt 4. In particular, since the locking base tilt prevention support portion 20 is formed as a ring-shaped protruding portion, the locking base 19 can be reliably supported using a simplified structure.

Furthermore, although the tilt of the locking base 19 with respect to the spool 9 varies in accordance with the lock position of a lock portion 19b of the locking base 19 determined by the pawl, the tilt of the locking base 19 with respect to the spool 9 can be prevented. Accordingly, the limit load of the seat belt 4 can be more reliably maintained. Still furthermore, since the tilt of the locking base 19 with respect to the spool 9 is prevented, a variation in a radius R of the bent portion 14d of the EA plate 14 can be restricted. Thus, the limit load of the seat belt 4 can be more reliably maintained.

Yet still furthermore, by disposing a lubricant agent between the locking base tilt prevention support portion 20 of the spool 9 and the supported portion 21 of the locking base 19, wear of the locking base tilt prevention support portion 20 of the spool 9 and wear of the supported portion 21 of the locking base 19 can be prevented even when the supported portion 21 of the locking base 19 is supported by the locking base tilt prevention support portion 20 of the spool 9 with a negligible gap therebetween so that the tilt of the supported portion 21 is restricted by the locking base tilt prevention support portion 20. In addition, the spool 9 can be smoothly rotated relative to the locking base 19. Accordingly, the limit load of the seat belt 4 can be more reliably maintained.

Note that in the above-described example, the EA plate 14 is indirectly supported by the spool 9 and the locking base 19 via the first EA plate support member 15 and the second EA plate support member 16. However, the first EA plate support member 15 and the second EA plate support member 16 are not always required. In the seat belt retractor 3 according to the present invention, the EA plate 14 can be directly supported by the spool 9 and the locking base 19. Alternatively, the EA plate 14, the first EA plate support member 15, and the second EA plate support member 16 are not always required. The seat belt retractor 3 according to the present invention can be applied to a seat belt retractor including the EA member having only the torsion bar 12.

In addition, the seat belt retractor according to the present invention is applicable to a seat belt retractor that performs the two EA operations of a torsion bar and an EA plate based on, for example, the conditions of emergency and the weight of the occupant or a seat belt retractor that performs the EA operation of a torsion bar without performing the EA operation of an EA plate (e.g., the seat belt retractor described in PTL 1). That is, various design modifications and design changes may be made without departing from the spirit and scope of the invention as set forth in the claims that follow.

INDUSTRIAL APPLICABILITY

The seat belt retractor according to the present invention is employed in the seat belt system mounted in a vehicle, such as a motor vehicle. The seat belt retractor can be suitably used to limit the load imposed on the seat belt in case of emergency (e.g., at the time of collision). Thus, the seat belt retractor can prevent withdrawal of the seat belt retractor while absorbing the energy of the occupant.

REFERENCE SIGNS LIST

1: seat belt system
3: seat belt retractor
4: seat belt
6: tongue
7: buckle
9: spool
10: lock mechanism
11: deceleration detecting mechanism
12: torsion bar
13: stopper
14: energy absorbing (EA) plate
14d: bent portion
15: first EA plate support member
15b: pressing portion
16: second EA plate support member
19: locking base
20: locking base tilt prevention support portion
20a: locking base guide supporting surface
21: supported portion
21a: outer peripheral surface

What is claimed is:

1. A seat belt retractor comprising:
    a spool rotatably disposed, the spool retracting a seat belt;
    a lock mechanism having a locking member, the locking member rotating together with the spool at normal times, rotation of the locking member in a direction in which the seat belt is withdrawn being prevented in case of emergency;
    a first energy absorbing member configured to absorb inertial energy of an occupant and limit the load imposed on the seat belt when the spool rotates relative to the locking member in case of emergency;
    a spool relative-rotation lock member activated by the spool, the spool relative-rotation lock member locking rotation of the spool relative to the locking member if the spool rotates relative to the locking member by a predetermined amount;
    a locking member tilt preventing portion in the form of a ring shaped protrusion that is provided on the spool, wherein the locking member tilt portion prevents tilt of the locking member relative to the spool; and
    a supported portion provided in the locking member, the supported portion being fitted into the locking member tilt preventing portion so as to be rotatable relative to the locking member tilt preventing portion and supported by the locking member tilt preventing portion to prevent tilt of the locking member relative to the spool,
    wherein when the supported portion is fitted into the locking member tilt preventing portion, the supported portion is supported on a locking member guide supporting surface of the locking member tilt preventing portion, the locking member guide supporting surface is slidable relative to an outer peripheral surface of the supported portion and an end face of the locking member tilt preventing portion is slidable relative to an end face of the supported portion, and
    wherein the supported portion of the locking member is fitted into the locking member tilt preventing portion of the spool so that the tilt of the supported portion with respect to the spool is prevented.

2. The seat belt retractor according to claim 1, wherein the locking member tilt preventing portion is formed as a ring-shaped protruding portion.

3. The seat belt retractor according to claim 1, wherein the first energy absorbing member is disposed so as to be concentric with the spool,
    wherein the first energy absorbing member is formed to act as a torsion bar having a first end connected to the spool for rotation in unison with the spool and a second end connected to the locking member for rotation in unison with the locking member, and
    wherein when the spool rotates relative to the locking member, the torsion bar is torsionally deformed to limit the load imposed on the seat belt.

4. The seat belt retractor according to claim 1, further comprising:
    a second energy absorbing member disposed between the spool and the locking member, the second energy absorbing member absorbing inertial energy of an occupant and limiting the load imposed on the seat belt when the spool rotates relative to the locking member.

5. The seat belt retractor according to claim 4, wherein the second energy absorbing member is formed to act as an energy absorbing plate having a first end supported by the spool and a second end fixed to the locking member, and
    wherein when the spool rotates relative to the locking member, the energy absorbing plate deforms and limits the load imposed on the seat belt.

6. The seat belt retractor according to claim 5, wherein when the energy absorbing plate is inactive, the energy absorbing plate extends from the second end fixed to the locking member in a direction in which the seat belt is withdrawn, is bent into a U shape to form a bent portion, and extends from the bent portion in a direction in which the seat belt is retracted.

7. The seat belt retractor according to claim 1, wherein the spool relative-rotation lock member is formed as a nut-shaped stopper, and the stopper is threadably mounted on a male screw formed on the locking member, and
    wherein when the spool rotates relative to the locking member, the stopper is rotated by the spool, moves along the male screw by a predetermined distance, and locks the rotation of the spool relative to the locking member.

8. A seat belt system for restraining an occupant by a seat belt in case of emergency, the seat belt system comprising:
    a seat belt retractor configured to retract the seat belt, the seat belt retractor stopping withdrawal of the seat belt in case of emergency;

a tongue slidably supported by the seat belt withdrawn from the seat belt retractor; and a buckle that allows the tongue to be releasably engaged therewith, wherein the seat belt retractor is the seat belt retractor according to claim 1.

9. The seat belt retractor according to claim 1, wherein the spool relative-rotation lock member is provided between the spool and the locking member to lock rotation of the spool relative to the locking member when the spool rotates relative to the locking member by the predetermined amount.

10. The seat belt retractor according to claim 1, wherein the spool relative-rotation lock member contacts both the spool and the locking member to lock rotation of the spool relative to the locking member when the spool rotates relative to the locking member by the predetermined amount.

* * * * *